(12) United States Patent
Chen et al.

(10) Patent No.: US 8,315,067 B2
(45) Date of Patent: Nov. 20, 2012

(54) MOUNTING APPARATUS FOR PCI CARD

(75) Inventors: Xiao-Zhu Chen, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 252 days.

(21) Appl. No.: 12/789,758

(22) Filed: May 28, 2010

(65) Prior Publication Data
US 2011/0228500 A1 Sep. 22, 2011

(30) Foreign Application Priority Data

Mar. 18, 2010 (CN) .......................... 2010 1 0126809

(51) Int. Cl.
*H05K 7/14* (2006.01)
(52) U.S. Cl. ................ 361/802; 361/679.32; 361/679.4; 361/679.58; 361/737; 361/747; 361/756; 361/759; 361/801; 361/809; 439/271; 439/347; 439/377; 439/637

(58) Field of Classification Search .................. 361/802, 361/679.32, 679.4, 679.58, 737, 747, 756, 361/759, 801, 809; 439/271, 347, 377, 637
See application file for complete search history.

(56) References Cited

U.S. PATENT DOCUMENTS

| | | | | |
|---|---|---|---|---|
| 5,757,618 | A | * | 5/1998 | Lee .......................... 361/679.32 |
| 6,296,511 | B1 | * | 10/2001 | Tseng et al. .................. 439/377 |
| 6,549,425 | B1 | * | 4/2003 | Kosugi .......................... 361/809 |
| 6,902,419 | B2 | * | 6/2005 | Conway et al. ............... 439/347 |
| 7,335,032 | B1 | * | 2/2008 | Lee ............................... 439/76.1 |
| 7,672,143 | B2 | * | 3/2010 | Chou et al. ..................... 361/801 |
| 2003/0199188 | A1 | * | 10/2003 | Kosugi et al. ................ 439/271 |
| 2008/0013297 | A1 | * | 1/2008 | Tao et al. ....................... 361/801 |
| 2010/0271768 | A1 | * | 10/2010 | Fan et al. .................... 361/679.4 |
| 2011/0051363 | A1 | * | 3/2011 | Chen et al. ............... 361/679.58 |

* cited by examiner

*Primary Examiner* — Xiaoliang Chen
(74) *Attorney, Agent, or Firm* — Altis Law Group, Inc.

(57) ABSTRACT

A mounting apparatus is configured for securing a PCI card and includes a securing member and a latch member. The securing member extends along a first direction. A protrusion is located on the securing member. The latch member is capable of securing the other end of the PCI card and defines a securing slot. The protrusion is inserted in the secured slot along a second direction perpendicular to the first direction.

6 Claims, 4 Drawing Sheets

MOUNTING APPARATUS FOR PCI CARD

BACKGROUND

1. Technical Field

The present disclosure relates to a mounting apparatus for securing a Peripheral Component Interconnect (PCI) card to a chassis.

2. Description of Related Art

Usually, only one end of a PCI card is secured to a chassis of a computer when the PCI card is inserted into a PCI connector of a motherboard. However, the PCI card, in particular a long PCI card, may encounter instability during the computer's normal operation.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
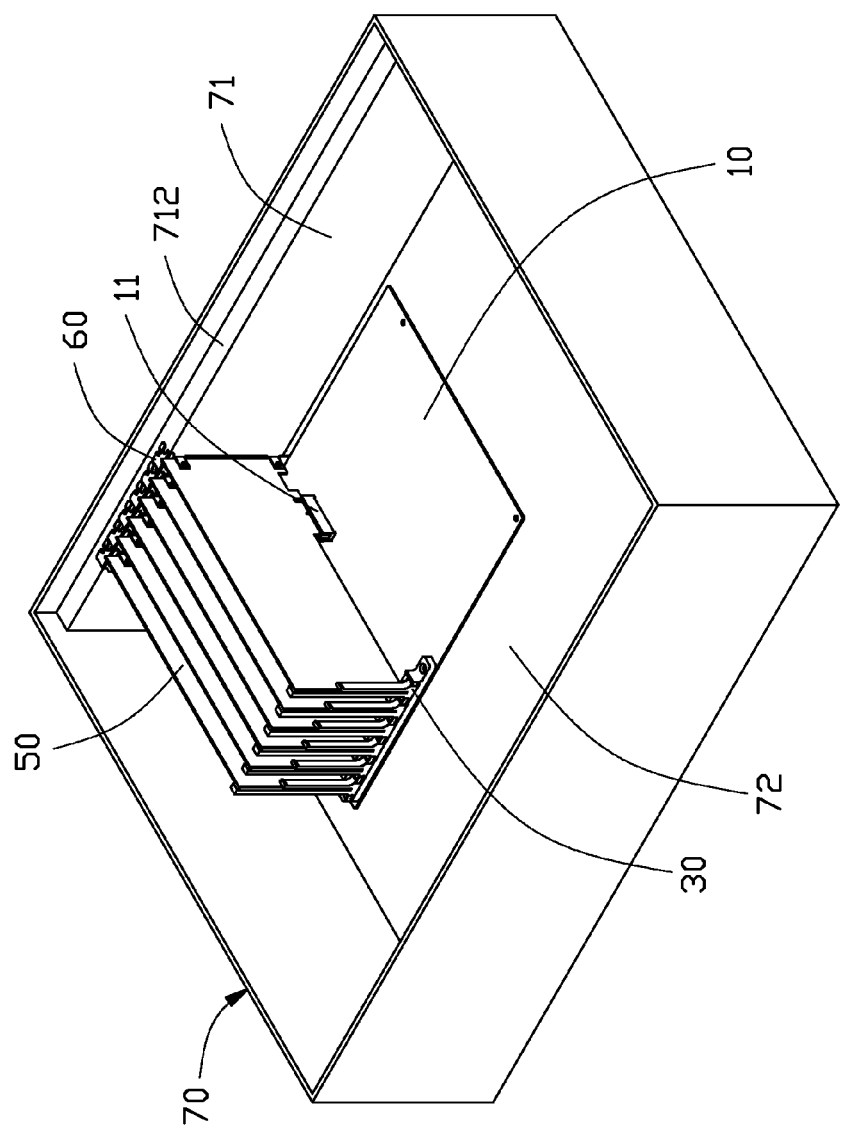
FIG. 1 is an assembled view of a mounting apparatus and a plurality of PCI cards in accordance with an embodiment.
Figure 2:
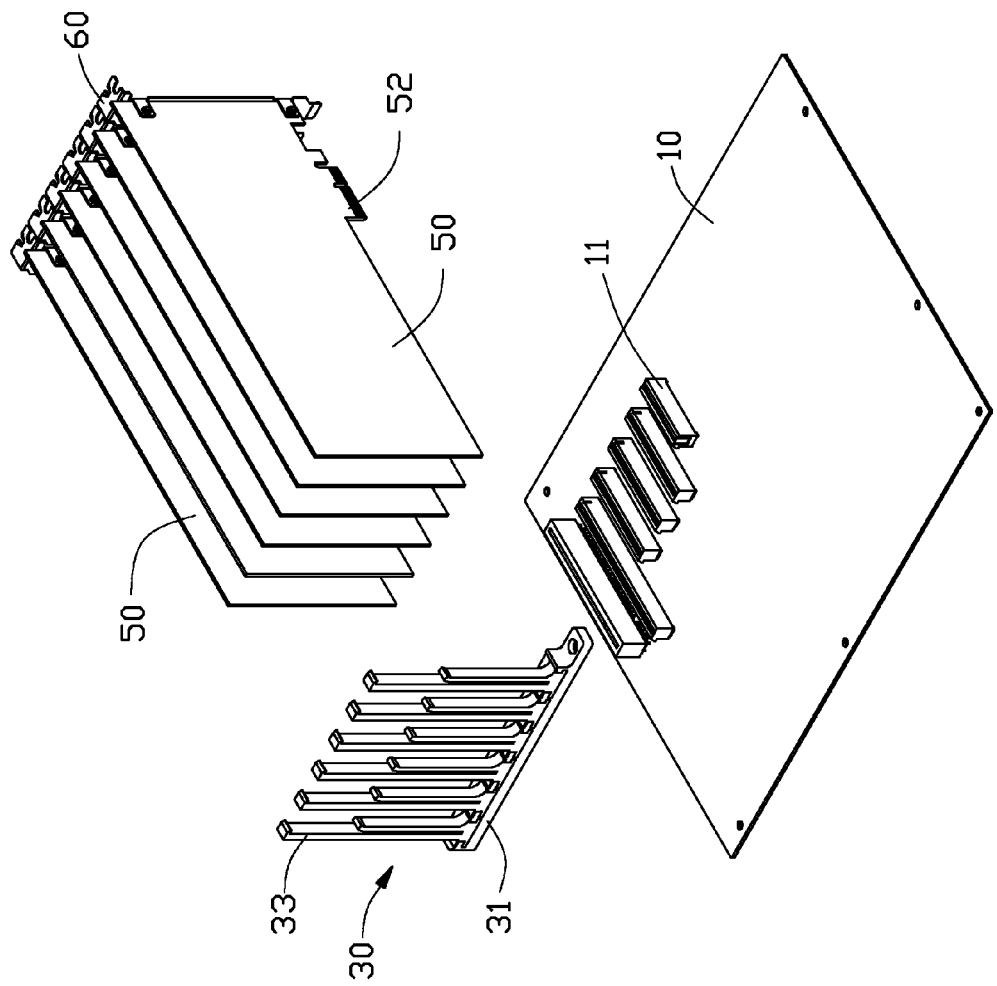
FIG. 2 is an exploded view of a printed circuit board, the locking mechanism, and the plurality of PCI cards of FIG. 1.
Figure 3:
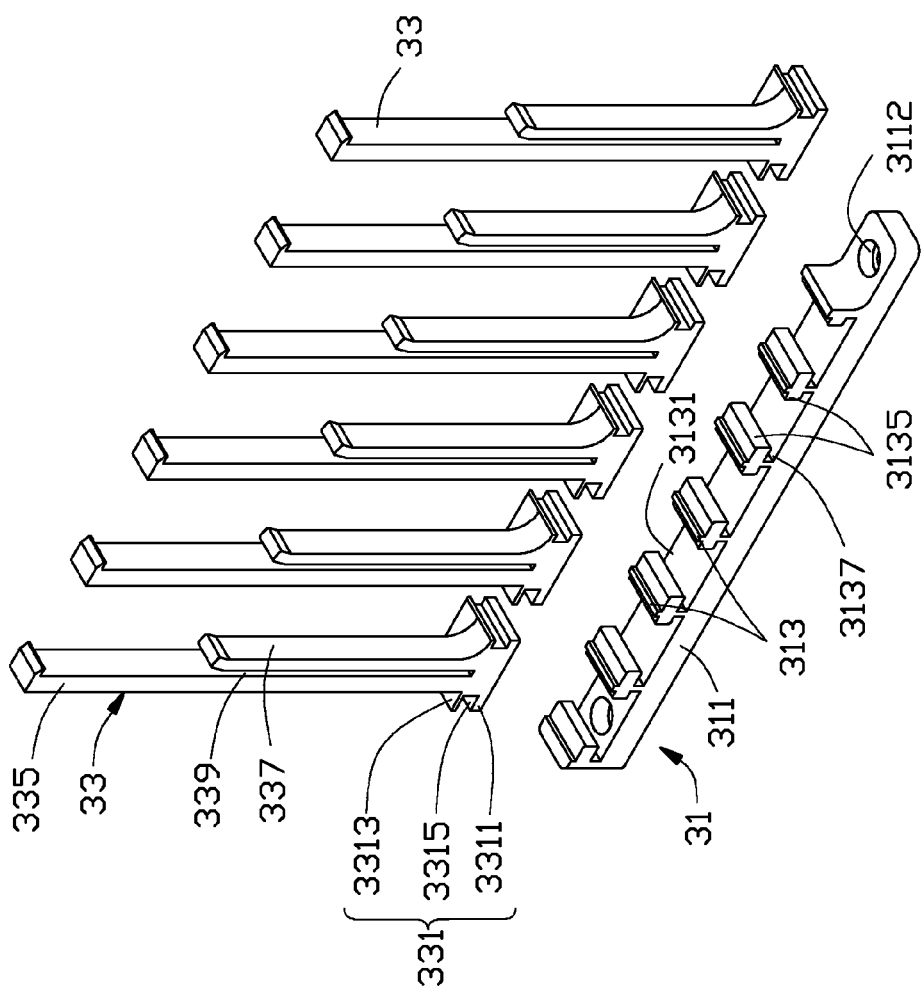
FIG. 3 is an exploded view of a locking mechanism of FIG. 1.

Referring to FIGS. 1-2, a mounting apparatus in accordance with an embodiment is configured for securing a plurality of PCI cards 50 each with a pin portion 52. The mounting apparatus includes a chassis 70, a locking mechanism 30, and a plurality of securing plates 60.

The chassis 70 includes a bottom wall 72 and a sidewall 71 connected to the bottom wall 72. In one embodiment, the sidewall 71 is substantially perpendicular to the bottom wall 72. A printed circuit board 10, such as a motherboard, is secured to an inner surface of the bottom wall 72. A plurality of PCI connectors 11 is located on the printed circuit board 10 and are capable of receiving the pin portions 52 of the PCI cards 50 to be electronically connected with the printed circuit board 10. The printed circuit board 10 defines two through holes 15. A supporting portion 712 is located on an inner surface of the sidewall 71.

The locking mechanism 30 includes a securing member 31 and a plurality of latch members 33 capable of being secured to the securing member 31.

The securing member 31 includes a main portion 311. The main portion 311 extends along a direction and defines two securing holes 3112, corresponding to through holes 15 of the printed circuit board 10. A plurality of blocks 313 is located on the main portion 311. A holding space 3131 is defined between each two adjacent blocks 313, configured for receiving the latch members 33. Two protrusions 3135 are located in each holding spaces 3131 and extend towards each other. A gap 3137 is defined between each protrusion 3135 and the main portion 311.

Each latch member 33 includes a locking portion 331, a first lever 335 and a second lever 337. The locking portion 331 includes a first tab 3311 and a second tab 3313 at each of opposite sides. A securing slot 3315 is defined between the first tab 3311 and the second tab 3313, configured for receiving the protrusion 3135 of the securing member 31. The first tabs 3311 are configured to be inserted into the gaps 3137 of the securing member 31. The first lever 335 has a length greater than that of the second lever 337. A slit 339, defined between the first lever 335 and the second lever 337, receives the PCI card 50.

Each securing plate 60 is secured to one PCI card 50 and is capable of securing the PCI card 50 to the supporting portion 712 of the sidewall 71 of the chassis 70.

Figure 4:
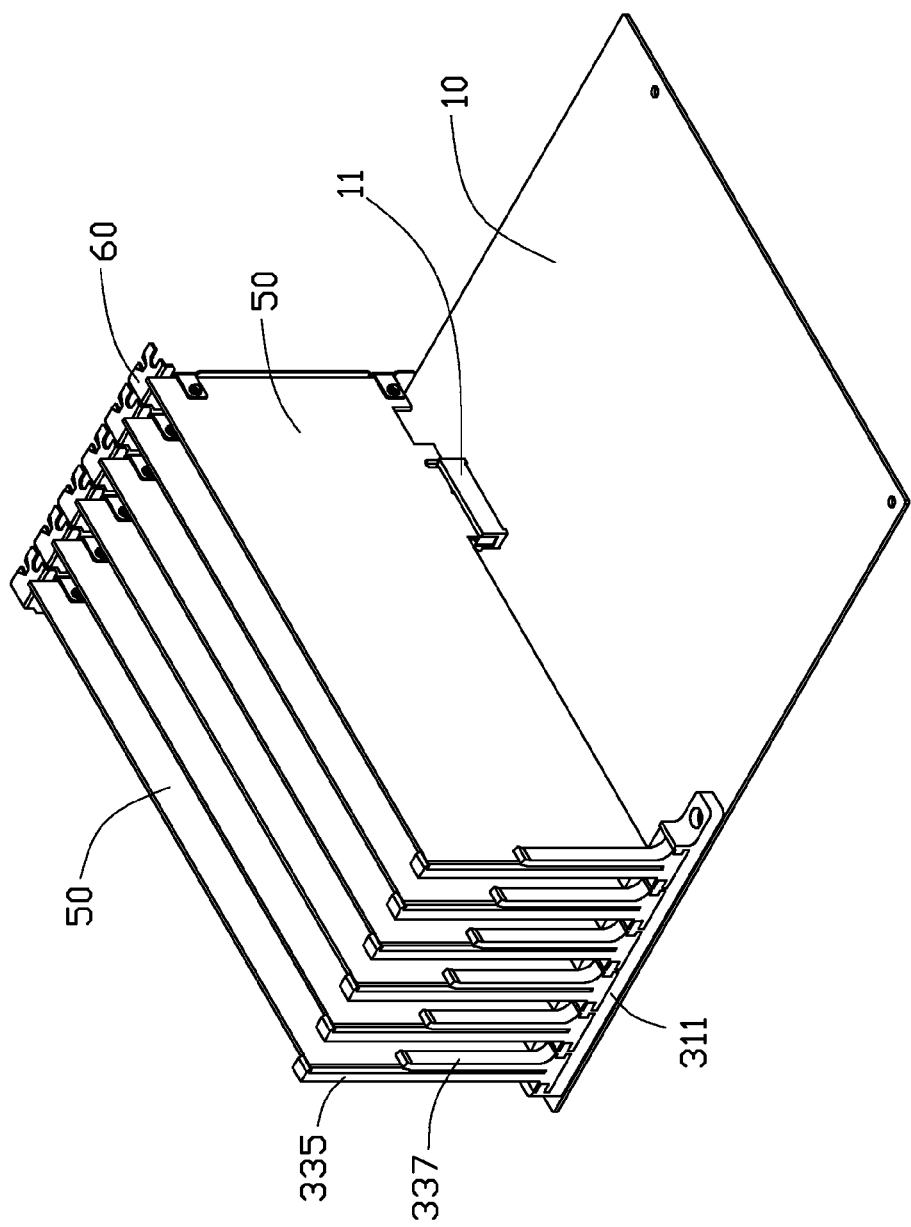
FIG. 4 is an assembled view of FIG. 3.

Referring to FIGS. 1 and 4, the printed circuit board 10 is fixed on the bottom wall 72 of the chassis 70. The securing member 31 of the locking mechanism 30 is placed on the printed circuit board 10, and the securing holes 3112 of the securing member 31 correspond to the through holes 15 of the printed circuit board 10. Two fasteners (not shown), such as screws, are screwed into the securing holes 3112 and the through holes 15 to secure the securing member 31 to the printed circuit board 10 or the bottom wall 72.

The pin portions 52 of the PCI cards 50 are inserted into the PCI connectors 11 of the printed circuit board 10. The PCI cards 50 are substantially perpendicular to the sidewall 71 of the chassis 70. The securing plates 60 are secured to the support portion 712 of the sidewall 71, and one end of each PCI card 50 is adjacent to the securing member 31. The locking portions 331 of the latch members 33 are inserted into the holding spaces 3131 of the securing member 31 along a first direction substantially perpendicular to the sidewall 71 and the extending direction of the main body 3311. The first tabs 3311 of the securing member 31 are received in gaps 3137 of the securing member 31. The protrusions 3135 of the securing member 31 are received in the securing slots 35 of the latch member 33. The ends of the PCI cards 50 are received in the slits 339 of the latch member 33. Therefore, the PCI cards 50 are secured to the chassis 70.

In removal of the PCI cards 50, the latch members 33 are removed from the securing member 31 along a direction opposite to the first direction, and the PCI cards 50 are disengaged from the slits of the latch members 33. Then, the securing plates 60 are disengaged from the supporting portion 712 of the sidewall 71. The PCI cards 50 can be taken out from the chassis 70.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus configured for securing a Peripheral Component Interconnect (PCI) card, the mounting apparatus comprising:

a securing member, the securing member extending along a first direction, a protrusion located on the securing member; and a latch member, the latch member capable of securing the PCI card and defining a securing slot;

wherein the protrusion is inserted in the securing slot along a second direction that is substantially perpendicular to the first direction; the securing member is located on a printed circuit board; a chassis comprising a bottom wall and a sidewall perpendicularly connected to the bottom wall; the printed circuit board is secured to the bottom wall; and the sidewall is capable of securing the PCI card.

2. The mounting apparatus of claim 1, wherein the latch member defines a slit capable of receiving the PCI card.

3. The mounting apparatus of claim 2, wherein the latch member comprises a first lever and a second lever, and the slit is defined between the first lever and the second lever.

4. The mounting apparatus of claim 3, wherein the first lever of the latch member has a length greater than that of the second lever.

5. The mounting apparatus of claim 1, wherein the securing member defines a holding space receives the latch member.

6. The mounting apparatus of claim 5, wherein a first tab and a second tab are located on the latch member, and the securing slot is defined between the first and second tabs; the securing member comprises a main portion and two blocks located on the main portion, the holding space is defined between the two blocks, and the protrusion is located on one of the two blocks; and the securing member defines a gap between the protrusion and the main portion to receive the first tab.

* * * * *